United States Patent [19]
Ohta et al.

[11] Patent Number: 5,425,008
[45] Date of Patent: Jun. 13, 1995

[54] MAGNETO-OPTICAL MEMORY DEVICE WHEREON OVERWRITING OPERATION CAN BE CARRIED OUT THROUGH LIGHT INTENSITY MODULATION AND METHOD FOR RECORDING AND ERASING USING IT

[75] Inventors: Kenji Ohta, Kitakatsuragi; Hiroyuki Katayama, Nara; Junichiro Nakayama, Shiki, all of Japan

[73] Assignee: Sharp Kabushiki Kaisha, Osaka, Japan

[21] Appl. No.: 965,358

[22] Filed: Oct. 23, 1992

[30] Foreign Application Priority Data

Oct. 25, 1991 [JP] Japan .................................. 3-279297

[51] Int. Cl.$^6$ ............................................... G11B 11/00
[52] U.S. Cl. ...................................... 369/13; 369/277; 369/275.2; 360/114
[58] Field of Search .................... 369/13, 14, 277, 278, 369/279, 284, 285, 286, 288, 275.1, 275.2, 275.3, 275.4, 32; 365/122; 360/114, 59; 427/127, 131; 428/336, 694 R, 900, 694 ML; 430/321, 323

[56] References Cited

U.S. PATENT DOCUMENTS

| | | | |
|---|---|---|---|
| 4,778,747 | 10/1988 | Ohta et al. | 430/321 |
| 4,801,499 | 1/1989 | Aoyama et al. | 428/336 |
| 4,853,912 | 8/1989 | Akasaka et al. | 369/73 |
| 4,985,881 | 1/1991 | Saito et al. | 369/13 |

FOREIGN PATENT DOCUMENTS

| | | | |
|---|---|---|---|
| 0405741A2 | 1/1991 | European Pat. Off. | |
| 0539228 | 4/1993 | European Pat. Off. | 369/13 |
| 183647 | of 1982 | Japan. | |
| 5006590 | 1/1993 | Japan | 369/13 |

OTHER PUBLICATIONS

"Direct Overwrite by Light Power Modulation on Magneto-Optical Double-Layered Media" (The 53rd study meeting by the Magnetic Society of Japan, 1988, pp. 87-92).

"Direct Overwrite by Leakage Field Modulation of the Thermo-Magnetic Biasing Layer", (Proceedings of Magneto-Optical Recording International Symposium '91, J. Magn. Soc. Jpn., vol. 15, Supplement No. S1(1991), pp. 315-318).

*Primary Examiner*—Georgia Y. Epps
*Assistant Examiner*—Ali Neyzari
*Attorney, Agent, or Firm*—David G. Conlin; Kevin J. Fournier

[57] ABSTRACT

A magneto-optical memory device is provided with a recording track having a recording film and a guide track wherein a perpendicular magnetic film, whose magnetization direction is arranged in one direction, is formed, the recording track and the guide track being alternatively disposed. A recording operation is carried out using a circular magnetic field generated from the perpendicular magnetic film by projecting a light beam only on the recording track so as to raise the temperature of the recording film. When erasing, the light beam is projected on the recording track and respective portions of the guide tracks located on both sides of the recording track so as to raise the temperature thereof. As the temperature rises, the magnetization of the perpendicular magnetic film becomes smaller, and an erasing operation is therefore performed using an external magnetic field.

12 Claims, 3 Drawing Sheets

MAGNETO-OPTICAL MEMORY DEVICE WHEREON OVERWRITING OPERATION CAN BE CARRIED OUT THROUGH LIGHT INTENSITY MODULATION AND METHOD FOR RECORDING AND ERASING USING IT

FIELD OF THE INVENTION

The present invention relates to a magneto-optical memory device to be adopted in a magneto-optical recording-reproduction apparatus employing the light intensity modulation, such as a magneto-optical disk, a magneto-optical card, etc., and a method for recording and erasing using the magneto-optical memory device.

BACKGROUND OF THE INVENTION

For a method for recording and erasing using a magneto-optical memory device, which utilizes magneto-optical effect, various types of overwriting methods have been proposed, such as the magnetic field modulation and the light intensity modulation. With the magnetic field modulation, a recording operation is carried out by reversing the magnetization direction while successively projecting a laser beam. Whereas, the recording operation is carried out by modulating the intensity of the laser beam with the light intensity modulation. However, with the magnetic field modulation, there is a limit in improving the recording speed because of the time required for reversing the magnetic head which reverses the magnetization direction. Therefore, for high speed memory, the magneto-optical memory device employing the light intensity modulation has been researched and developed.

For the magneto-optical memory device which employs the light intensity modulation, a magneto-optical memory device consisting of an initialization-use magnet and a double-layered film has been proposed. (The 53rd meeting on Magnetics by Japan Magnetic Society (1988), p.78)

With the memory device of double-layer structure, an overwriting operation is carried out through the light intensity modulation by the following way.

A recording film, whereon information is recorded, consists of a recording layer and a writing layer laminated in a direction perpendicular to the surface of the recording film. The recording layer has its Curie temperature that is below the Curie temperature of the writing layer, and high coercive force at room temperature. Furthermore, the magnetic field to be applied from the initialization-use magnet is greater than the coercive force of the writing layer but smaller than the coercive force of the recording layer. First, the magnetization direction of the writing layer is arranged in the magnetization direction of the initialization-use magnet.

Next, a light beam with high level or low level intensity is projected. When projecting the light beam with low level intensity, the temperature of the writing layer is not raised to the Curie temperature. The magnetization direction of the writing layer is therefore maintained and copied to the recording layer by the exchange coupling force. On the other hand, in the case of high level intensity, both recording layer and the writing layer are raised above the respective Curie temperatures. Thus, the writing layer is magnetized in the magnetization direction of an externally-applied recording magnetic field. Thereafter, the magnetization direction of the recording layer is arranged in the same direction.

However, the discussed arrangement creates the following problems: Since the magnetic field of the initialization use magnet, whose intensity is ten times as strong as that of the magnetic field for recording, is required for the initialization-use magnet, the initialization-use magnet becomes larger in size, and therefore the recording-reproduction apparatus becomes larger in size and more complicated. In order to obtain the recording film wherein exchange coupling force is exerted between the two layers, the selection of the composition and the manufacturing process for the recording film are complicated. Furthermore, the material whose Curie temperature is below the Curie temperature of the writing layer must be selected for the recording layer. For this reason, the Kerr rotation angle of the recording layer becomes small, and the high quality reproduction signal may not be obtained.

SUMMARY OF THE INVENTION

An object of the present invention is to provide a magneto-optical memory device whereon an overwriting operation can be carried out through the light intensity modulation without requiring initialization-use magnetic field, and to provide a method for recording and erasing using the magneto-optical memory device.

Another object of the present invention is to provide a magneto-optical memory device which permits the quality of a reproduction signal to be improved and which can be easily manufactured.

In order to achieve the above objects, the magneto-optical memory device in accordance with the present invention is provided with a transparent substrate whereon a recording track having a recording film and a guide track are alternatively formed. Further, a perpendicular magnetic film is formed on the guide track, which is magnetized in a direction perpendicular to the recording film.

A method for recording and erasing in accordance with the present invention using the magneto-optical memory device is characterized by a light beam which has a varying diameter. The light beam is projected only on the recording track when recording, and is projected on the recording track and respective portions of the guide tracks located on both sides of the recording track when erasing.

When projecting the light beam only on the recording track so as to raise the temperature of the recording film, the recording film is magnetized in a direction opposite to the magnetization direction of the perpendicular magnetic film by a circular magnetic field. The circular magnetic field is generated from the perpendicular magnetic film formed in the guide tracks located on both sides of the recording track. On the other hand, when erasing, the circular magnetic field of the irradiated portion with the light beam of the perpendicular magnetic film becomes small. This is because the perpendicular magnetic film has such a characteristic that the intensity of the magnetization thereof becomes smaller as the temperature raises. In this state, the recording film is magnetized by the external magnetic field in a direction opposite to the magnetization direction when the recording operation is carried out.

With the above arrangement, since the writing layer is not required, the materials having high Curie temperatures can be used for the recording layer. As a result, the Kerr rotation angle becomes larger, and the reproduction signal quality is improved. Moreover, since the above arrangement does not require the initialization-use magnetic field, the recording and reproducing apparatus employing the magneto-optical memory device can be made thinner and more compact.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic cross-sectional view showing the configuration of the magneto-optical disk in accordance with the present invention.

FIG. 2 is a graph showing the characteristic of the perpendicular magnetic film of FIG. 1.

FIG. 3 is a view showing a recording operation on the magneto-optical recording disk of FIG. 1.

FIG. 4 is a view showing an erasing operation from the magneto-optical recording disk of FIG. 1.

DETAILED DESCRIPTION OF THE PREFERRED EMBODIMENTS

The following will describe one embodiment of the present invention referring to FIG. 1 through FIG. 6.

Figure 1:
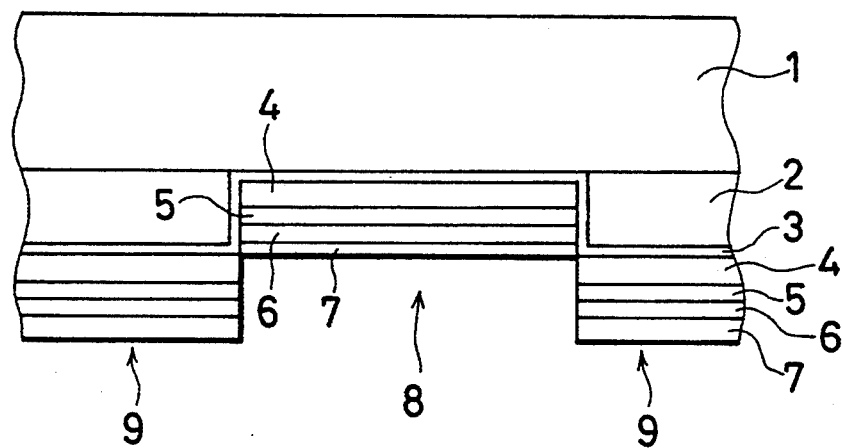
FIG. 1 through FIG. 4 show one embodiment of the present invention.

As shown in FIG. 1, a magneto-optical disk as an example of the magneto-optical memory device of the present invention is provided with a transparent substrate 1 made of glass or plastic with a thickness of 0.5–1.5 mm. Further, a recording track 8 and a guide track 9 with a width of 0.5 $\mu$m are alternately formed on the transparent substrate 1. In addition, the pitch between guide tracks 9 is 1.5 $\mu$m.

A perpendicular magnetic film 2 made of TbCo with a thickness of 50–500 nm is formed on a portion of the transparent substrate 1 whereon the guide track 9 is formed. A dielectric film 3 made of A1N is formed on the perpendicular magnetic film 2 and on a portion of the transparent substrate 1 whereon the recording track 8 is formed. The recording track 8 is provided adjacent to the guide tracks 9. Further, a dielectric film 4 with a thickness of 70–100 nm, a recording film 5 mainly made of DyFeCo with a thickness of 20–50 nm, a dielectric film 6 mainly made of A1N with a thickness of 20–50 nm and a reflecting film 7 mainly made of A1 with a thickness of 50 nm are laminated in this order on the dielectric film 3. Here, the dielectric film 4 has a greater refractive index than that of the dielectric film 3. As shown in the figure, the dielectric film 3 is also formed on the side faces of the perpendicular magnetic film 2, i.e., the boundary portion from the recording track 8. With this arrangement, a magnetic domain wall between the recording track 8 and the guide track 9 can be prevented from being moved. Therefore, the thickness of the dielectric film 3 is set in the order of several Å—Å multiplied by ten.

A manufacturing process of the magneto-optical disk is briefly described below.

First, for the perpendicular magnetic film 2, a TbCo film is formed on the transparent substrate 1. Thereafter, a positive-type photo-resist (not shown) is applied on the surface of the TbCo film. Next, using a photomask (not shown) wherein a pattern of the guide track with a thickness of substantially 1 $\mu$m and the pitch of substantially 1.5 $\mu$m is formed beforehand, the pattern of the guide track is transferred to a photo-resist through the contact exposure method disclosed in U.S. Pat. No. 4,778,747. Here, the pattern of the guide track stored in the photomask is formed using a visor film such as Ta. Thereafter, the pattern of the guide track is developed by removing the portion of the photo-resist, the portion corresponding to the recording track. Thereafter, the TbCo film is etched using the remaining photo-resist as a mask. After the etching, the remaining photo-resist is removed, and dielectric film 3 is formed on the transparent substrate 1 and on the magnetic film with perpendicular magnetization 2 (TbCo film). Furthermore, the previously described dielectric film 4, the recording film 5, dielectric film 6 and the reflecting film 7 are laminated in this order in order to obtain the magneto-optical disk.

The following description will discuss a method for recording and erasing with respect to the magneto-optical disk with the above arrangement using the overwriting method.

Figure 2:
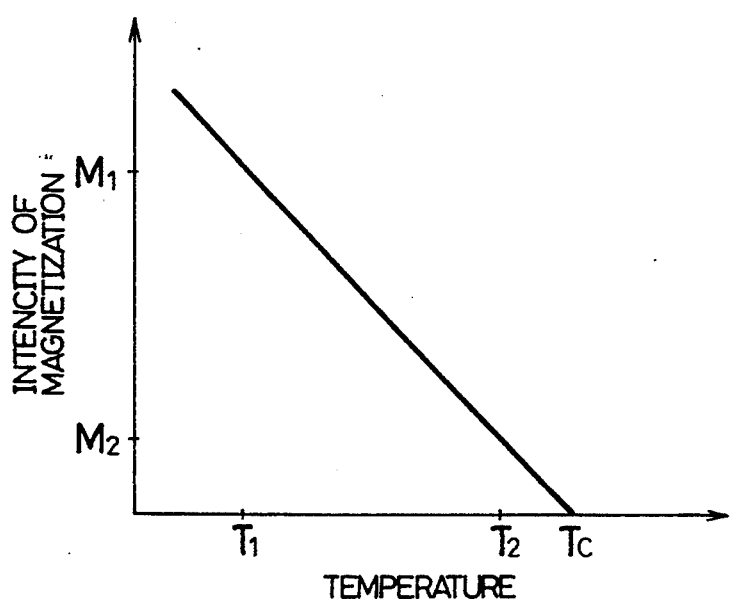

The perpendicular magnetic film 2 exhibits a magnetization characteristic shown in FIG. 2. Namely, the film 2 has a great magnetization at around room temperature $T_1$, and the magnetization becomes weaker as the temperature rises. In addition, the magnetization direction is upward in FIG. 1.

Figure 3:
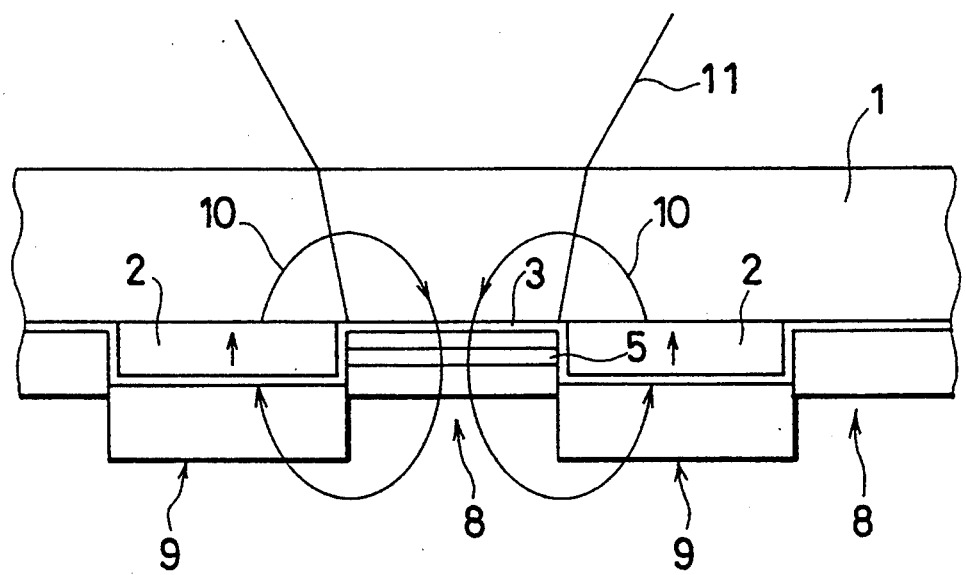

When recording, first, a light beam 11 is projected on the recording track 8 as shown in FIG. 3. Thus, the temperature of the recording film 5 corresponding to the irradiated portion with the light beam 11 of the recording track 8 is raised above its Curie temperature. In this state, the magnetization direction of a circular magnetic field 10 corresponding to the recording track 8 is opposite to the magnetization direction of the perpendicular magnetic film 2 (downward in the figure). The circular magnetic field 10 is generated from the perpendicular magnetic film 2 formed in the guide tracks 9 located on both sides of the recording track 8. Therefore, when the projection of the light beam 11 is stopped and the temperature of the recording track 8 starts dropping, a downward magnetization is generated on the recording film 5 of the recording track 8, thereby completing the recording operation.

Figure 4:
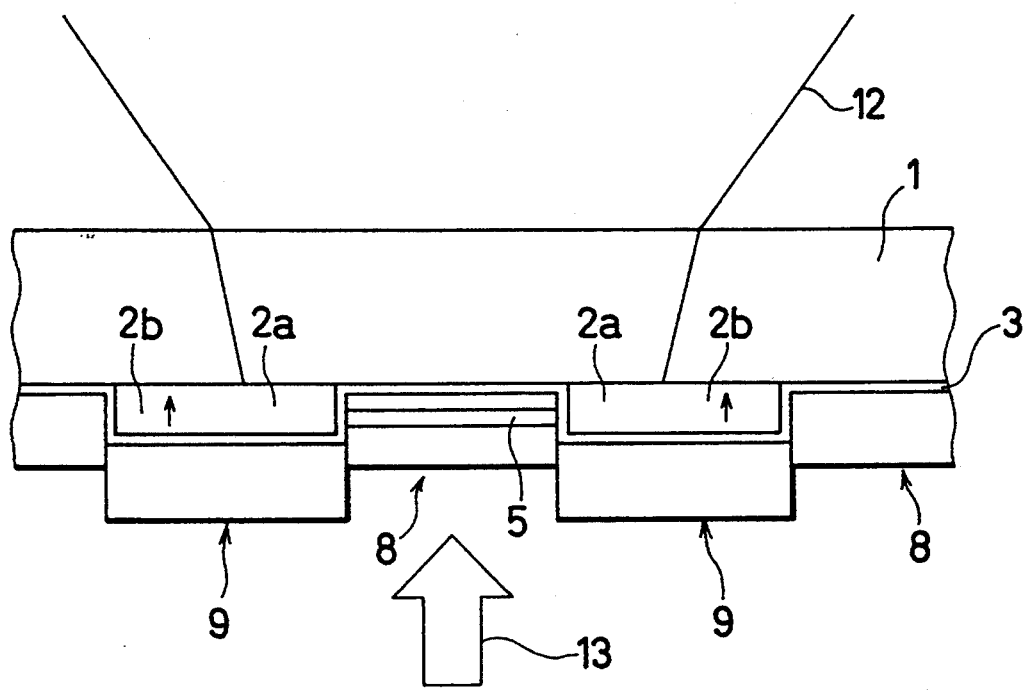

In the case of the erasing operation, a light beam 12 is projected on the recording track 8 so that a light spot is formed on the recording track 8 and jutted out into the guide tracks 9 on both sides of the recording track 8 as shown in FIG. 4. In order to achieve this, the diameter of the light beam 12 is set larger than that of the light beam 11 used in recording. When the light beam 12 is projected on portions 2a of the perpendicular magnetic film 2 formed in the guide tracks 9, the temperature of the portions 2a rises, and the magnetization of the portions 2a becomes weaker. FIG. 2 shows a distribution of magnetization intensity of the perpendicular magnetic film 2 ranging from $M_2$ to $M_1$. Here, the temperature of the portion 2a in the vicinity of the recording track 8 is designated by $T_2$, and the temperature of the portions 2b, whereon the light beam 12 is not projected, is designated by $T_1$. Therefore, the temperature of the recording film 5 of the recording track 8 is raised above the Curie temperature, and the circular magnetic field 10 exerted thereon becomes fairly weak, the circular magnetic field 10 being generated from the perpendicular magnetic film 2. In this state, an external magnetic field 13, which is stronger than the circular magnetic field 10, is applied on the recording track 8 in an upward direction in the figure. Thus, the projection of the light beam 12 is stopped, and the temperature of the recording track 8 starts dropping. As a result, the magnetization in an upward direction is generated on the recording film 5, thereby completing the erasing operation.

In addition, in the case of a recording operation, the magnetization is also applied from the external magnetic field 13 to the recording track 8. However, since the magnetization of the circular magnetic field 10 is greater than that of the external magnetic field 13, the magnetization direction of the recording film 5 is downward.

With the magneto-optical disk having the described arrangement, the reflective index of the light beam is 50% on the guide track 9, whereas 10–20% on the recording track 8. This is because the recording track 8 has a multi-layer structure consisting of the dielectric film 4, the recording film 5, and the dielectric film 6, so as to have a greater Kerr rotation angle of the reflected light. Therefore, a tracking servo signal is obtained from the difference in the reflective indexes between the guide track 9 and the recording track 8.

According to the magneto-optical disk of the present embodiment, the dielectric film 3, the dielectric film 4, the recording film 5, the dielectric film 6, and the reflecting film 7 are laminated also on the perpendicular magnetic film 2 formed in the guide tracks 9. However, in the previously described manufacturing process, it may be also arranged such that the TbCo film is etched after the development of the photo-resist, and the above films 3 to 7 are formed without removing the remaining photo-resist; thereafter, both the remaining photo-resist and the above films 3 to 7 laminated on the TbCo film are removed by means of the lift-off.

Figure 5:
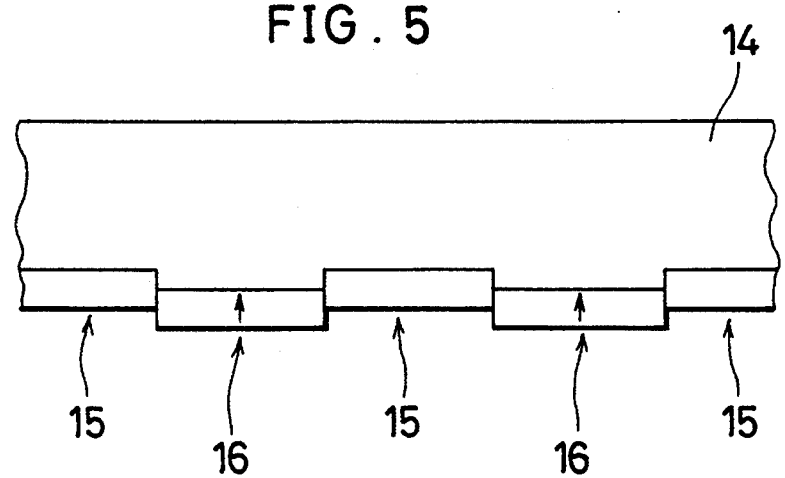
FIG. 5 is a schematic cross-sectional view showing another configuration of the magneto-optical disk of the present invention.
Figure 6:
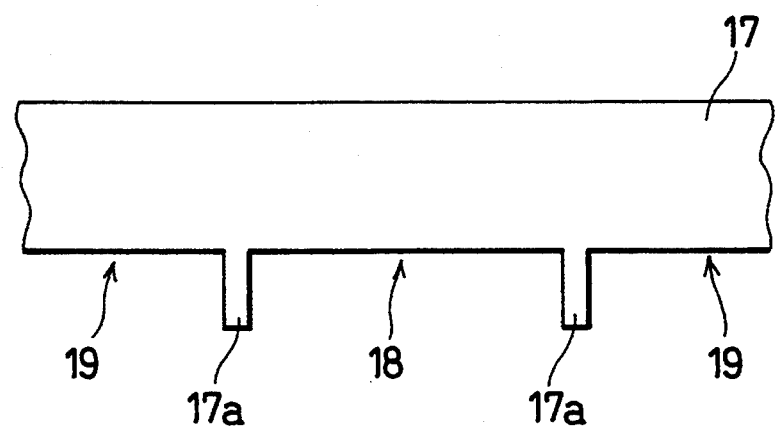
FIG. 6 is a schematic cross-sectional view showing a transparent substrate of the magneto-optical disk having another configuration of the present invention.

With the above magneto-optical disk, the dielectric film 3 is formed in order to prevent the movement of the magnetic domain wall. However, the movement of the magnetic domain wall can be prevented by other arrangements. For example, as shown in FIG. 5, protrusions and recessions are formed on the transparent substrate 14, and by providing a gap between the guide track 16 and the recording track 15, the movement of the magnetic domain wall can be prevented. In this case, the gap between the recording track 15 and the guide track 16 may be set between 20–100 nm, and the film formed on the recording track 15 and the guide track 16 needs to be set thicker than the gap.

Other than the above arrangements, the movement of the magnetic domain wall can also be prevented by providing on the transparent substrate 17 a projected portion 17a with a width of 0.1–0.3 μm between the recording track 18 and the guide track 19. In this case, the height of the projected portion 17a needs to be set more than half of the film thickness formed in the recording track and in the guide track 19.

According to the above arrangement of the magneto-optical disk and the method for recording and erasing with respect to the magneto-optical disk, the conventional multi-layer structure is not required, and information can be recorded on the recording layer 5 of a single-layer structure when the movement of the magnetic domain wall can be prevented, and the recording and erasing operations can be carried out using the external magnetic field 13 or the magnetic field generated from the adjacent guide tracks 9. For this reason, materials having high Curie temperatures may be used for the recording layer 5.

While this invention has been disclosed in conjunction with specific embodiments thereof, it is evident that many alternative, modifications and variations will be apparent to those skilled in the art in light of the foregoing description. Accordingly, it is intended to embrace all such alternative, modifications, and variations as fall within the spirit and broad scope of the appended claims.

What is claimed is:

1. A magneto-optical memory device provided with a recording track having a recording film whereon information is to be recorded, and a guide track indicating a position where a recording or reproducing operation is carried out, the recording track and the guide track being alternatively formed,
    wherein the magnetization direction of the recording film, which is perpendicular to the recording film, is arranged in a magnetization direction of an externally applied magnetic field with a temperature rise,
    and the guide track, which is magnetized in a direction parallel to the magnetization direction of the recording film, comprises a perpendicular magnetic film whose magnetization becomes smaller as the temperature rises,
    and wherein said device comprises a dielectric film for preventing the movement of a magnetic domain wall formed between the recording track and the guide track.

2. The magneto-optical memory device as set forth in claim 1,
    wherein the recording track and the guide track are formed on a transparent substrate, and the recording track comprises a dielectric film, a recording film and a reflecting film formed on the transparent substrate.

3. The magneto-optical memory device as set forth in claim 1, wherein said means for preventing the movement of the magnetic domain wall is a transparent substrate provided between the recording track and the guide track.

4. The magneto-optical memory device as set forth in claim 2,
    wherein the transparent substrate includes a first face and a second face, and the recording track and the guide track being formed on the second face, and a distance between the first face and the recording film is set shorter than a distance between the first face and the perpendicular magnetic film.

5. The magneto-optical memory device as set forth in claim 1,
    wherein the recording film is made of DyFeCo, and the perpendicular magnetic film is made of TbCo.

6. A method for recording and erasing with respect to a magneto-optical memory device provided with a recording track including a recording film whereon information is to be recorded and a guide track including a perpendicular magnetic film magnetized in a direction parallel to the magnetization direction of the recording film, the recording track and the guide track being alternatively formed, comprising the steps
    heating up the recording film above its Curie temperature by projecting a light beam only on the recording track when recording;
    varying the diameter of a light beam so as to project the light beam on the recording track and respective portions or the guide tracks located on both sides of the recording track when erasing;

heating up the recording film above its Curie temperature and the irradiated portion with the light beam of the perpendicular magnetic film so as to make the magnetization of the perpendicular magnetic film smaller; and arranging the magnetization direction of the recording film in a magnetization direction of an external magnetic field by applying the external magnetic field;

wherein a dielectric film is provided between the recording track and the guide track for preventing movement of a magnetic domain wall.

7. The magneto-optical memory device as set forth in claim 1, wherein:

said recording film has a single layer structure, whereon information is recorded using directions of magnetization perpendicular to a film surface.

8. The magneto-optical memory device as set forth in claim 1, wherein:

a direction of magnetization in said recording film under the externally applied magnetic field is set parallel to a direction of magnetization in said perpendicular magnetic film.

9. The magneto-optical memory device as set forth in claim 1, wherein:

when said recording film is heated to a first temperature, a direction of magnetization in said recording film is arranged in a direction of the externally applied magnetic field that passes through said recording film, while when said recording film is heated to a second temperature that is lower than the first temperature, by a stray magnetic field exerted from perpendicular magnetic films adjacent to said recording film, the direction of magnetization in said recording film is arranged in a direction opposite to the direction of magnetization in said perpendicular magnetic films adjacent to said recording film.

10. The magneto-optical memory device as set forth in claim 1, wherein:

said recording film has a single layer structure, whereon information is recorded using directions of magnetization perpendicular to a film surface.

11. The magneto-optical memory device as set forth in claim 1, wherein:

a direction of magnetization in said recording film under the externally applied magnetic field is set parallel to a direction of magnetization in said perpendicular magnetic film.

12. The magneto-optical memory device as set forth in claim 1, wherein:

when said recording film is heated to a first temperature, a direction of magnetization in said recording film is arranged in a direction of the externally applied magnetic field that passes through said recording film, while when said recording film is heated to a second temperature that is lower than the first temperature, by a stray magnetic field exerted from perpendicular magnetic films adjacent to said recording film, the direction of magnetization in said recording film is arranged in a direction opposite to the direction of magnetization in said perpendicular magnetic films adjacent to said recording film.

* * * * *